Feb. 24, 1942.  A. P. WOOD  2,274,351
FABRICATED DYNAMOELECTRIC MACHINE
Filed Dec. 20, 1939
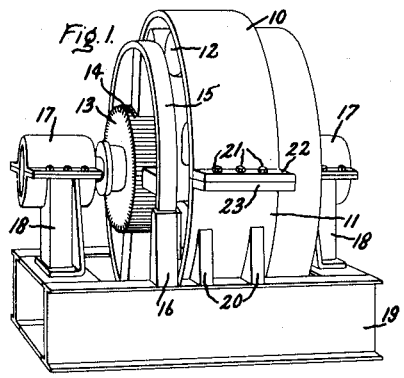
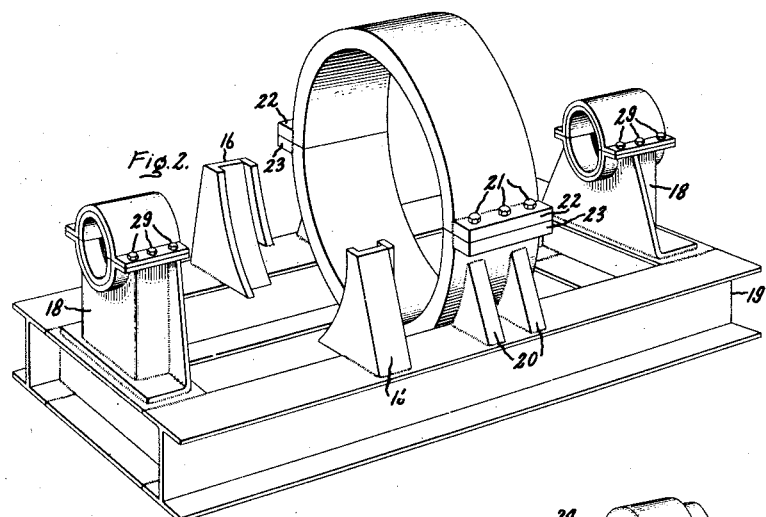
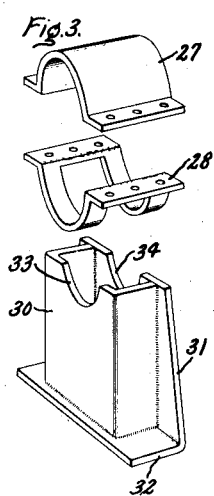
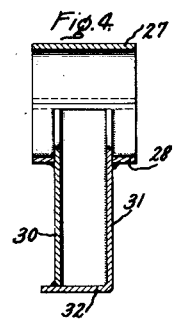
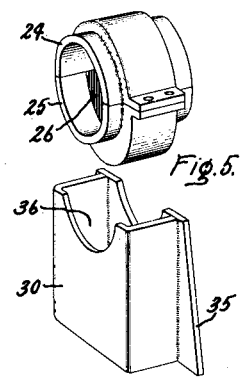
Inventor:
Alexander P. Wood,
by Harry E. Dunham
His Attorney.

Patented Feb. 24, 1942

2,274,351

UNITED STATES PATENT OFFICE 2,274,351

FABRICATED DYNAMOELECTRIC MACHINE

Alexander P. Wood, Schenectady, N. Y., assignor to General Electric Company, a corporation of New York Application December 20, 1939, Serial No. 310,204

6 Claims. (Cl. 171—252)

My invention relates to dynamo-electric machines and more particularly to a fabricated construction therefor.

Heretofore, all fabricated dynamo-electric machines have been manufactured with a base member machined and drilled and a stationary member which has secured thereto machined, drilled, and doweled feet members. In assembling these parts it is therefore necessary to line up the parts and install shims between the feet members and the frame, and then bolt the feet members thereto. In addition the bearing standards have machined, drilled, and doweled feet which also require shims between the feet and the base member. The bearing standards, of course, also need bolts to secure them to the base member.

An object of my invention is to provide a dynamo-electric machine with a fabricated construction which is simple in design, sturdy in construction, and economical to manufacture.

Another object of my invention is to provide a fabricated construction for a dynamo-electric machine which may be manufactured with a minimum number of mechanical operations.

I accomplish this and other objects by providing a fabricated construction for a dynamoelectric machine having a split frame member with the lower half of the frame member being welded directly to a base member. The upper half of the frame member is then bolted to the lower half. Split bearing members are held by my improved bearing standard which is also welded directly to the base.

My invention will be more fully set forth in the following description referring to the accompanying drawing, and the features of novelty which characterize my invention will be pointed out in the claims annexed to and forming a part of this specification.

In the drawing, Fig. 1 is a side elevation of a dynamo-electric machine provided with an embodiment of my invention; Fig. 2 is a view in perspective of the fabricated construction of the stationary members of the dynamo-electric machine shown in Fig. 1; Fig. 3 is an exploded view in perspective showing the bearing standard and bearing bracket of Figs. 1 and 2; Fig. 4 is a sectional side elevation of the bearing standard and bracket shown in Figs. 1 and 2, and Fig. 5 is an exploded view in perspective showing the cast bearing and a modification of the bearing standard of Figs. 3 and 4.

Referring to the drawing, in Fig. 1 have illustrated a dynamo-electric machine including a split frame member having semicylindrical portions 10 and 11. Held by the frame member and inside thereof, there are placed field coils 12 each having conventional pole pieces cooperating therewith. Adapted to act electrodynamically with the fixed windings and their pole pieces, I provide a conventional rotatable member 13 which has a commutator 14, a brush yoke 15 being supported by a brush yoke support 16 for holding the conventional brushes which cooperate with the commutator 14. In order to support the rotatable member 13 I provide a plurality of split bearing members 17. These bearing members are in turn supported by a bearing standard 18, whose structures are shown more clearly in Figs. 3, 4, and 5, and which will be more completely described hereinafter.

In order to provide a dynamo-electric machine with a fabricated construction, which can be economically manufactured with the least number of mechanical operations, I permanently secure the lower half frame member 11 to a base member 19 by any suitable means, such as welding. Such a construction dispenses with the heretofore more expensive construction which provided for a base member machined and drilled so as to receive frame feet members which were also machined and drilled. With my improved construction, however, such expensive operations are avoided, since feet members 20 are welded directly to the frame 11 and directly to the base member 19. The base member may be formed in any suitable manner, and in the illustrated embodiment of my invention the structure includes a plurality of I-beams welded together. Any suitable number of feet may be used and in the illustrated construction four such members are shown, two placed on opposite sides of the base member. In order to provide an arrangement so that the rotatable member may be easily inserted and removed from the frame member, the upper half frame member 10 is removably secured to the lower half in any suitable manner, such as by bolts 21. In order to provide a suitable structure whereby the upper and lower frame members may be conveniently and tightly held together by means of the bolt members 21 I provide cooperating flange members 22 and 23 on the upper and lower frame members respectively.

Since the frame member is welded to the base member 19 without the necessity of machining and drilling operations, I provide the bearing standard 18 which also can be secured to the base member in any suitable manner, such as welding. As may be seen more fully in Figs. 3, 4, and 5, the bearing 17 is formed of two substantially semi-cylindrical members 24 and 25. These members may be cast and a suitable Babbitt sleeve member 26 inserted therein. In order to secure the two semicylindrical members 24 and 25 together and further to secure the assembled bearing to the standard 18, I provide fabricated members 27 and 28. Both these fabricated members and the semicylindrical bearing sleeves have flange members with suitable holes therein, so that a unitary structure may be formed when bolts 29 are inserted in the holes.

In order to provide an economical bearing standard which is sturdy in construction the bearing standard 18 is made of a fabricated construction and includes a U-shape member 30 and an upstanding bracket member 31. As shown in Figs. 3 and 4 this bracket member 31 has a bent foot portion 32 and the standard is therefore formed by welding the U-shape member 30 to the bracket member 31 so that the U-shaped member rests on the bent foot portion 32 of the upstanding bracket. Semicircular seat portions 33 and 34 are formed in the U-shaped member and bracket member respectively, so as to form a suitable cradle for the lower semicylindrical bearing sleeve 25 and the fabricated member 28. This member 28 may be permanently attached to the bearing standard in any suitable manner, such as welding. This welded construction described above is illustrated in the sectional side elevation of Fig. 4. If, after the frame and bearing have been integrally secured to the base member, it is found necessary to machine some of the surfaces in order to secure alignment of the dynamo-electric machine, the fabricated construction may be placed in a boring mill and the surfaces turned in one setup.

It will be further noted that Fig. 5 illustrates a fabricated bearing standard which is sturdy in construction and even more economical to manufacture. As in Figs. 3 and 4, the standard has a U-shape member 30, but instead of welding the U-shape member to a bracket with a bent foot portion, the U-shape member is welded to a flat plate 35. This standard is welded directly to the base member. The welded joint is made all the way around the edge of the standard where it bears on the base. The purpose of this is to form a fluid tight joint. Thus it will be seen that the U-shape member and the flat plate together with the base member form a fluid tight chamber 36. This chamber may then act as an oil reservoir for the bearings, and oil rings can dip down into the oil chamber and feed the bearing with oil. A similar oil chamber is also formed between the U-shaped member of Figs. 4 and 5 and the bracket member 31 with the bent foot portion. Thus it will be seen that I have provided a simple arrangement for an oil reservoir in addition to the sturdy bearing standard which is economical to manufacture and providing an integral dynamo-electric machine load-carrying supporting structure as shown in Figs. 1 and 2 which requires little machining to provide the desired relationship between different supporting elements.

In order, therefore, to form an inexpensive and permanent attachment between the bearing standard and the frame member it is only necessary to weld the standard to the base member. The above described bearing standard structure is particularly useful where a number of different sizes of machines are being manufactured. Instead of having to cast a combination bearing standard and lower bearing sleeve member of the particular size necessary, a standard size bearing may be used and the particular size bearing standard may be obtained from a stock of different size standards. When it is necessary to make a machine of the above mentioned type it is only necessary to pick the particular size of the fabricated standard desired and weld that standard to a standard bearing. Such a procedure dispenses with the much more expensive procedure heretofore used, where it was necessary each time a different size standard was required to cast a new standard and bearing sleeve member.

Where such a structure as described above is used for a direct current machine the brush yoke supports 16 may be formed and also secured permanently to the base member 19 by any suitable means, such as welding.

In view of the foregoing it will be seen that I have provided a fabricated construction for a dynamo-electric machine which is simple in design, sturdy in construction, and economical to manufacture, since the necessary parts may be assembled with the minimum number of mechanical operations. It may be further seen that I have provided an improved bearing standard which may be manufactured and applied to different size machines of the above mentioned type with the minimum of cost.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States, is:

1. A dynamo-electric machine including a base member, a split frame member forming substantially two halves, means permanently securing one of said halves to said base member for providing an integral dynamo-electric machine load-supporting structure, and means removably securing said other half to said first mentioned half.

2. A dynamo-electric machine including a base member, a split frame member forming substantially two halves, means permanently securing one of said halves to said base member, means removably securing said other half to said first mentioned half, and a plurality of bearing standards permanently secured to said base member; said permanently secured together base, half frame member, and bearing standard forming an integral dynamo-electric machine supporting structure.

3. A dynamo-electric machine including a base member, a split frame member forming substantially two halves, one of said halves being welded to said base member, the other of said halves being removably secured to said first mentioned half, a plurality of bearing standards welded to said base member, and a brush yoke support welded to said base.

4. A dynamo-electric machine including a base member, a split frame member forming substantially two halves, means including feet members for permanently securing one of said halves to said base member, and means removably securing said other half to said first mentioned half.

5. A dynamo-electric machine including a base member, a split frame member forming substantially two halves, a plurality of feet members welded to one of said halves and to said base member for permanently securing said half to said base member, and bolt members removably securing said other half to said first mentioned half.

6. A dynamo-electric machine including a base member, a split frame member forming substantially two halves, one of said halves being welded to said base member and the other of said halves being removably secured to said first mentioned half, a split bearing sleeve forming substantially two halves, a bearing standard, said bearing standard being welded directly to said base member and to one of said sleeve halves, the other of said sleeve halves being removably secured to said first mentioned sleeve half; said welded together base member, half frame member, bearing standard, and half bearing sleeve forming an integral dynamo-electric machine supporting structure.

ALEXANDER P. WOOD.